US005992342A

United States Patent [19]

Nordin et al.

[11] Patent Number: 5,992,342

[45] Date of Patent: Nov. 30, 1999

[54] NAVIGATION AID

[76] Inventors: Robert P. Nordin, 904 Captains Way; Donald H. Kranendonk, 193 Commodore Dr., both of Jupiter, Fla. 33477

[21] Appl. No.: 09/008,936

[22] Filed: Jan. 20, 1998

[51] Int. Cl.[6] .............................. B63B 8/00; B60Q 1/26; G09F 13/16; G09F 7/00; G09F 15/00

[52] U.S. Cl. .......................... 114/343; 116/35 R; 116/46; 40/584; 40/582; 40/583; 40/606

[58] Field of Search .................................. 441/6, 13, 16, 441/20; 345/7; 340/425.5; 114/343, 364; 116/35 R, 46; 370/316; 701/213; 40/584, 582, 583, 606

[56] References Cited

U.S. PATENT DOCUMENTS

| | | | |
|---|---|---|---|
| 1,723,429 | 8/1929 | Lee | 116/35 R |
| 5,179,385 | 1/1993 | O'Loughlin et al. | 342/176 |
| 5,636,916 | 6/1997 | Sokolowski | 362/61 |
| 5,725,228 | 3/1998 | Livingston | 280/414.1 |
| 5,898,680 | 4/1999 | Johnstone et al. | 370/316 |

*Primary Examiner*—Sherman Basinger
*Assistant Examiner*—Patrick Muldoon
*Attorney, Agent, or Firm*—McHale & Slavin, PA

[57] ABSTRACT

The instant invention is a navigation aid for use in depicting the buoyage system for navigable waters. The device has a support base that is secured to the helm of the vessel having a rotatable faceplate with daymark indicia placed thereon. The device provides a reminder to the vessel operator of the buoyage system and the position of the vessel in relation to the buoyage system. The device may be illuminated for nighttime usage by either direct or indirect illumination. A method of incorporating the positioning indicia in combination with a chart plotter is provided.

16 Claims, 2 Drawing Sheets

NAVIGATION AID

FIELD OF THE INVENTION

This invention is directed to the field of marine navigation aids and in particular to a device securable to a vessel for aiding the operator in the proper navigation of the vessel in relation to buoys and daymarks.

BACKGROUND OF THE INVENTION

Since the majority of the earth is covered by water, proper navigation through the water is necessary for safe passage. Waterways are used for commercial transportation as well as recreation. For this reason, most Maritime Nations have adopted a uniform system of buoyage to direct traffic through heavily traveled or problematic waters. One of the most prominent aids to navigation consists of floating buoys, both lighted and unlighted, and daymarks.

The United States follows a lateral system of buoyage. When returning from a seaward location, red buoys are kept on the right (starboard) and green buoys are kept on the left (portside). If a vessel travels the intracoastal waterways along the Atlantic coast, across the Gulf Stream and up the Pacific coast, the vessel is traveling in a clockwise direction and must maintain the red buoys to the starboard side and green buoys to the port side. Coming in from the sea or proceeding up a harbor or river to its source would be considered returning. While traversing the Great Lakes, the direction is considered a westerly direction.

The phrase “red, right, returning” has become a universal reminder to assist mariners that the red buoys would mark the right side of the channel when returning from the sea. For example, a vessel on the Atlantic Ocean entering any inlet on the eastern side of the United States would traverse a buoyage area which marks the proper area of vessel travel. As previously mentioned, such an entrance requires the vessel to maintain the red buoys which would be on the starboard side and green buoys which would be on the port side. Once in the intracoastal should the vessel turn north then the buoys would be switched wherein the red buoys would be on the port side and the green buoys on the starboard side. However, had the operator turned south on the intracoastal way the buoys would have maintained their position as in the inlet with red on the starboard side and green on the port side. Should the operator travel the intracoastal waterway and then turn into any branch, the channel should then have red on the starboard side and green on the port side. Channel junctions may be either a nun or can painted in horizontal red and green band. If the top band is green the preferred channel is to the right and the buoy will be the shape of a can. If the top most band is red the preferred channel is to the left and the buoy will be in the shape of a nun. In England the waterway markings are the opposite of the United States wherein red (black) is on your port side and green is on the starboard side when returning from sea.

Such navigation aids are imperative for the safe operation of a vessel on the waterways but can obviously lead to momentary confusion to the vessel operator. Thus, despite the commonality of the buoyage system, the proper positioning of the buoys depends upon the direction the vessel is traveling. To further complicate these matters, in shallow waters including commercially used waterways and rivers, daymarks may be substituted for the floating buoys. Daymarks are supported on pilings typically positioned about fifteen (15') feet outside the navigable channel. As with the buoys, daymarks would be colored green or red as to indicate the proper position of the vessel in relation to the channel. Both buoys and daymarks have particular shapes to help the vessel operator distinguish the channel position from a distance. For instance, green daymarks are squares while green buoys are shaped as cans. Red daymarks are shaped in the form of a triangle while red buoys (nun’s) have a conical shaped top.

The buoyage system can be complicated for even the most experienced mariner, especially since the operator must also tend to other matters such as current, wind, and other vessels to name a few. Since vessels travel both ways on the waterway, the markers will be reversed during a portion of a vessel’s travel. At all time the vessel operator must remember which direction the vessel is facing. This becomes especially important if only a single marker exists. For instance, if an operator is heading north on the intracoastal, there are many positions wherein a single buoy or daymark indicates the channel. If the marker is green, the vessel operator must recognize that the mark is to be placed either to its port or starboard side. Should the vessel operator choose the wrong position, the vessel could run aground causing damage to the vessel and occupants. If the vessel operator was traveling in England familiar to the reverse buoyage system, traveling in the U.S. necessitates a change in the through process. As previously mentioned, the addition of current, wind, and other vessels makes even momentary confusion very dangerous.

What is needed is a navigation aid to remind vessel operators where the buoys and daymarks are to positioned upon passage of the vessel. In this manner the navigation aid should be placed upon a vessel preferably at the helm wherein the vessel operator can instantly view the navigation aid to determine the proper positioning of the operators vessel in relation to the navigation aids placed along the waterway.

SUMMARY OF THE INVENTION

The instant invention is a marker indicator that is placed at the helm of a vessel in either a physical form or as a visual indicator on a monitor. The device provides an instant indication of the proper location of buoyage system as a vessel traverses a waterway. For instance, in the primary embodiment, the device has an indicator faceplate having a replica of the green and red daymarks with a directional arrow placed therebetween. The directional arrow is set in the direction of the boat and once the vessel has entered a channel the navigation aid is set in accordance with the direction the vessel is heading so as to correspond with the buoys or daymarks to be traversed. In this manner, if the vessel operator is preoccupied as he approaches a single buoy, a quick glance at the navigation aid will remind the operator where the proper position of the vessel should be.

Once the vessel has entered a channel where the buoys and daymarks are reversed, the device has a provision for reversing the indicator card so as to cause a reversal of the position indicator. In this manner should the vessel operator again be preoccupied when approaching a buoy, simply glancing at the indicator will provide an instant reminder. The vessel operator need only preset the indicator and from that point forward use the indicator as a navigation aid while traversing the waterway in the same direction.

The indicators are green with an odd number which is universal for the can buoy and square daymark. The indicator is red with an even number which is universal for the nun buoy and triangle daymark. Thus, the vessel operator may look at color, shape, or numerical numbering and realize proper position of the buoy or daymark in relation to his vessel.

The device consists of a support base that can be secured to the helm of a vessel by attachment screws, hook and pile (Velcro), or adhesive. The base holds a pinion rod which extends upwardly therefrom through a faceplate on which the daymark indicia is placed. The faceplate includes a provision to couple to the pinion rod wherein the faceplate can be lifted from the base and rotated 180° to display indicia placed on the back of the faceplate.

The indicia is a replica of the lateral system daymarks having dual tone green for the port side and a dual tone red for the starboard side. The indicia can be formed from a reflective or fluorescence material. The reflective material provides self-illumination from dash lights while the fluorescence material is capable of glowing in the dark after being subjected to light.

An embodiment of the invention incorporates a light to illuminate the faceplate. In this embodiment, the base conceals a battery, light bulb, and control switch for purposes of illumination. The light can project from an aperture juxtaposition to the faceplate. Alternatively, the faceplate may be constructed from a translucent material wherein the light provides illumination of the faceplate with the daymark silhouette visible in the dark. Further, the power source may be external to the device wherein the illumination light is powered from the vessel in a similar manner to conventional gauge illumination. It should be noted that the indicia could be a can and nun in place of the square and triangle.

Another embodiment of the instant invention is to incorporate an indicator display into a chart plotter, GPS display, radar display, or the like. The indicator display is again a replica of the faceplate and indicia and is interfaced with a chart plotter providing buoyage position based upon the direction and location of the vessel. As the vessel approaches the buoy or daymark the software program of the indicator display can properly position the buoy or daymark indicia onto the screen providing the vessel operator with the position of the buoy or daymark but may also insert the marker number into the display. The portside and starboard side daymark indicia is first inserted into a computer system that is coupled to the chart plotter, the chart plotter having sufficient detail to distinguish channel markers. A GPS signal is further merged with the chart plotter providing a directional aspect to said chart plotter wherein the computer system will display the daymark indicia on a monitor. The display will position the portside and starboard side indicia in accordance with the directional movement of the vessel.

Thus an objective of the instant invention is to provide a navigation aid that provides a vessel operator with a visual reminder of the proper location of the vessel in relation to the daymarks or buoys.

Still another objective of the instant invention is to provide an inexpensive navigation aid that can be secured to any surface of a bridge or helm of a vessel to provide a buoyage indicator in a manner most conspicuous to the vessel operator.

Yet another objective of the instant invention is to disclose a buoyage reminder aid that is readily discernable in all types of lights by use of reflective or fluorescence materials.

Yet still another objective of the instant invention is to disclose a buoyage reminder aid that may include an illumination providing direct or indirect faceplate illumination.

Still another objective of the instant invention is to disclose the use of a buoyage system navigation aid that may be incorporated into a software program to interface with a chart plotter so as to depict the buoyage faceplate indicia on the screen of a display monitor.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
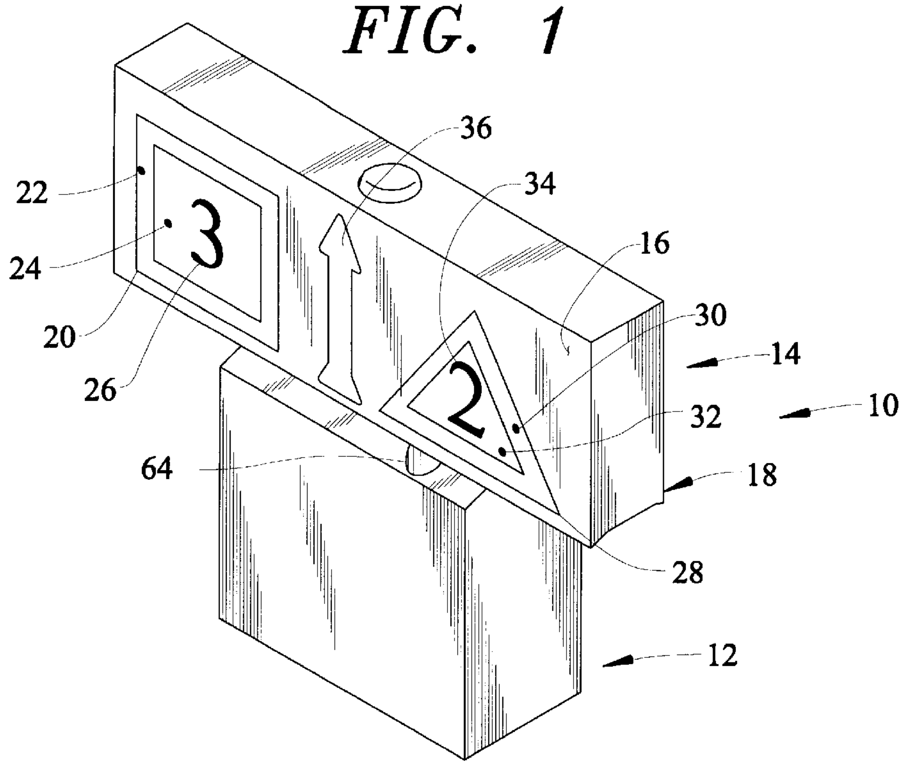
FIG. 1 is a perspective view of the invention.

Now referring to FIG. 1, a first embodiment of the instant invention is depicted by the numeral 10. The basic form of the invention incorporates a base support 12 and a rotatable faceplate 14. The base support 12 is a solid piece of material constructed from a single piece of wood, plastic, fiberglass, or formed from an injection molding process. The base support may be rectangular, circular, or conical in shape with the purpose of providing a secure support stand that can be mounted to the dash or helm of a vessel. Adhesive or mounting screws provide permanent securement. Alternatively, the use of a hook and pile attachment (Velcro) allows for a releasible securement.

The faceplate 14 is a substantially rectangular piece of opaque or translucent material that is pivotally secured to the support base 12. The faceplate 14 is further defined as having a front surface 16 and a rear surface 18, each surface depicting the Lateral System of daymark indicators. The port side daymark square 20 is positioned on the left side of the front surface. The square daymark is colored according to the USCG approved daymarks having a green boarder 22 encompassing a green square 24 housing an odd number 26 as depicted by numeral “3” placed in the center of the square. On the right side of the front surface 16 is a starboard side triangle 28 also colored in accordance with USCG standards having a first band of red 30 encompassing a red triangle 32 housing an even number 34 as depicted by numeral “2” located in the center of the triangle. Directional arrow 36 is positioned between the daymark indicators.

The daymarks can be formed from most any type of material and the actual construction is dependant upon consumer preference. For instance, the daymarks 20 and 28 may be made from non-reflective, reflective, or a fluorescence material allowing the vessel operator to choose the type of reminder most appropriate for the particular helm. On an enclosed bridge, when low level lighting is available, the use of a non-reflective material for the daymark construction is preferred. Open boats that are subjected to constant salt-water spray may incorporate a reflective material capable of providing sufficient illumination from dashboard lights. A fluorescence material provides the material of construction that will glow in the dark after being subjected to light. For example, a spotlight shined on the device may allow the fluorescence material to glow for a long period of time.

It should be noted that the marker indicia may also be embedded into the faceplate. If the faceplate is translucent or transparent, embedding daymark indicia into the structure allows reversal of the faceplate to properly position the daymark.

Figure 2:
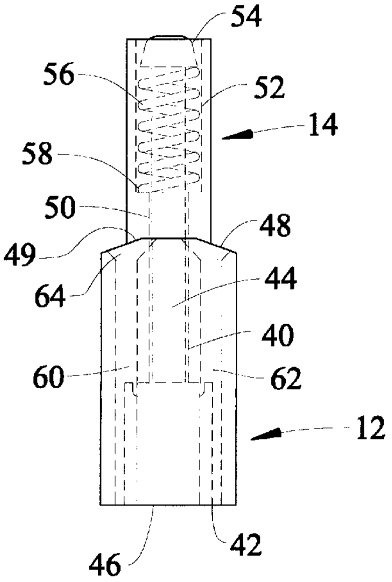
FIG. 2 is a cross sectional end view of FIG. 1.

Now referring to FIG. 2, set forth is an end view of FIG. 1 depicting the support base 12 and faceplate 14. Through the center of the support base 12 is a pilot hole 40 having a countersunk portion 42 allowing a pinion 44 to be raised above the bottom 46 of the base. The pilot hole 40 allows the pinion 44 to extend upwardly and out of the top 48 of the support base 12 into aperture 50 which extends along the height of the faceplate 14. The pinion can be made of a non-corrosive material such as stainless steel, fiberglass, or plastic. A spring countersunk hole 52 allows the pinion 44 to be coupled to securement nut 54 with spring 56 placed therebetween. A lower ledge 58 of the spring countersunk hole 52 provides a biasing ledge.

Pilot holes 60 and 62 extend from the top surface 48 of the support base 12 to the bottom surface 42. The pilot holes 60, 62 allow securement of the support base to the helm or dash of a vessel by placement of attachment screws through the pilot holes. The opening of each pilot hole, as shown by numeral 64 for pilot hole 60, is partially if not completely concealed by the faceplate 14, depending upon the width of the faceplate.

The placement of the attachment screws through the pilot holes 60, 62 requires faceplate 14 to be rotated 90 degrees to a position perpendicular to the support base. The support base preferably has an angular shaped top surface 48 of about a 20° slope. The bottom 49 of the faceplate, as further illustrated in FIG. 4, has a reciprocal shape to conform to the top surface 48. This operates in conjunction with the spring 56 so as to bias the faceplate 14 against the support base 12 to prevent rotation during vessel movement. Actual rotation requires the faceplate 14 to be physically lifted above the top surface 48 of the support base and rotated while the spring 56 is in a compressed position.

Figure 3:
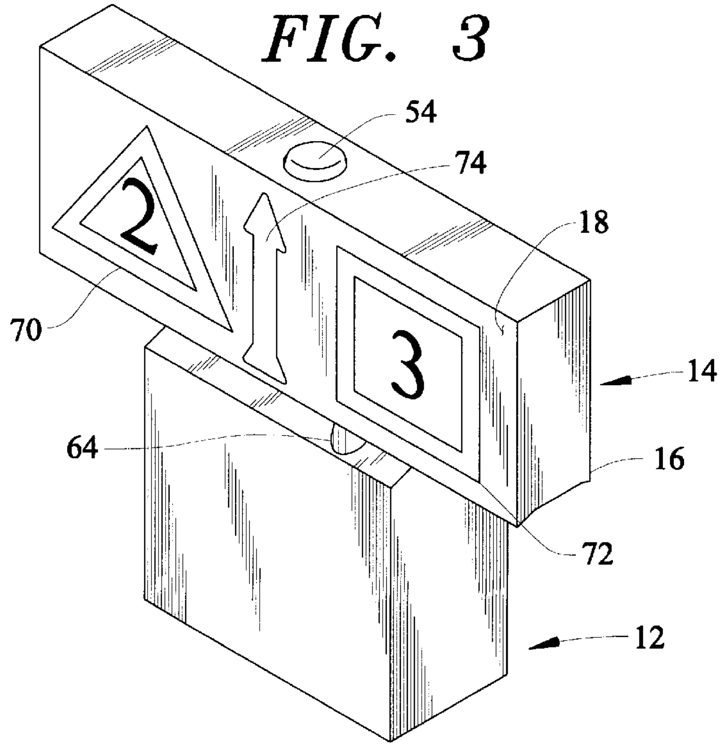
FIG. 3 is a perspective view of FIG. 1 depicting faceplate reversal.

Referring to FIG. 3, the base 12 is illustrated with the faceplate 14 placed in a reverse position. The rear surface 18 is shown rotated to a forward position. In this position the faceplate 14 illustrates a triangle 70 placed on port side and the square 72 placed on the starboard side. Arrow 74 is placed between the daymarks. As with the frontal surface, the daymarks each can be made of a non-reflective, reflective, or fluorescent material. The triangle 70 includes numeral "2" being an even number placed within the daymark. Square 72 has the numeral "3" being an odd number placed within the daymark. As previously mentioned, a transparent or translucent material will allow the embedding of the daymark within the faceplate. In such a circumstance the reverse side of the daymark could be viewed.

Figure 4:
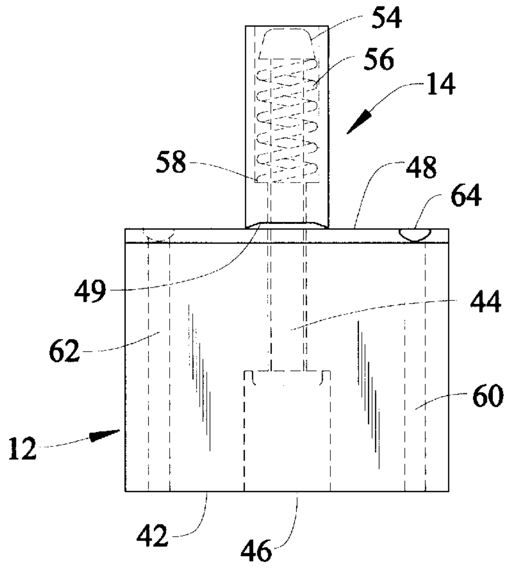
FIG. 4 is a front view of the base with the faceplate rotated 90 degrees.

FIG. 4 is a front cross sectional view of the support base 12 with pilot holes 60 and 62 depicted for use in securing of the support base to the bridge. The pinion 44 extends upward through the faceplate 14 thereby securing the faceplate to the support base by use of securement nut 54. Each pilot hole is countersunk to conceal the mounting screw from view when the faceplate is held in position.

Figure 5:
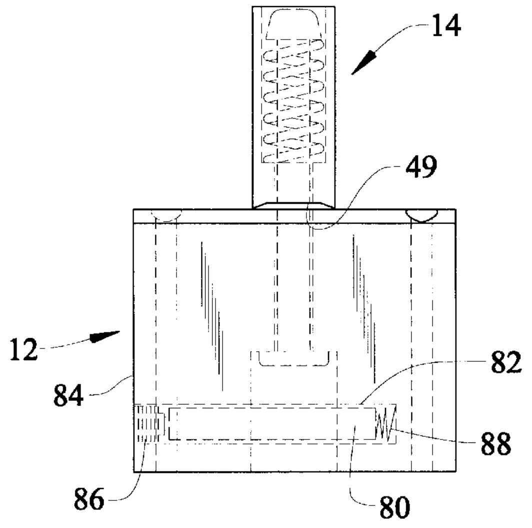
FIG. 5 is a second embodiment of FIG. 4 having a battery chamber.
Figure 6:
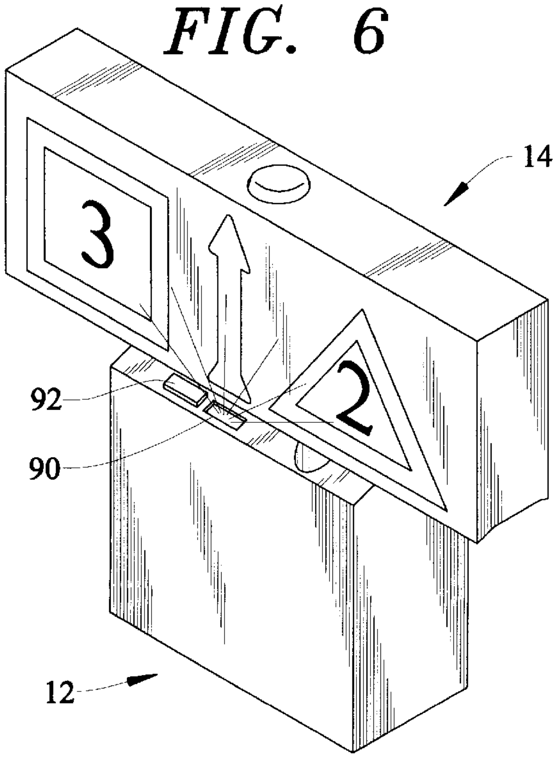
FIG. 6 is a perspective view of the second embodiment of the invention having the battery power a faceplate light.

As shown in FIG. 5, the second embodiment of this invention includes the positioning of a battery 80 within a battery sleeve 82 placed through an end wall 84 of the support base 12. The battery sleeve includes a threaded nut 86 for maintaining the battery 88 within the sleeve and a conductive spring 88 providing battery adjustment. The battery fits between the pilot holes and beneath the pinon 44. FIG. 6 illustrates support base 12 which now provides for the illumination of the faceplate 14 through aperture 90. The aperture may conceal a lamp or led light, not shown, which is electrically coupled to the battery or directly to the power source of the vessel. Switch 92 is an electrical slide switch which further slides over the aperture 90 providing an aperture seal when illumination is not necessary. All other aspects of the embodiment being the same as the first embodiment.

Figure 7:
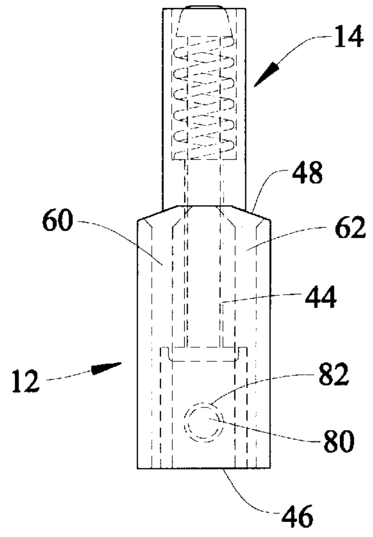
FIG. 7 is cross sectional end view of the second embodiment.
Figure 8:
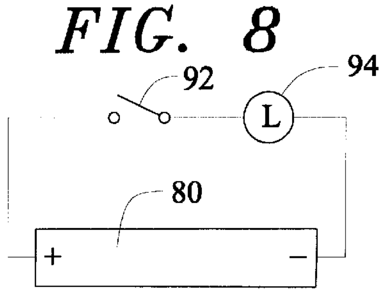
FIG. 8 is a simplified electrical schematic of the second embodiment.

FIG. 7 depicts a similar embodiment as that shown in FIG. 2 with battery 80 shown placed within battery sleeve 82. The battery capable of being mounted between the pilot holes 60, 62 and beneath the pinon 44. FIG. 8 depicts the battery 80 placed in combination with switch 92 and lamp 94 for a self contained illumination circuit. The use of a transparent or translucent material will allow the embedding of the daymark within the faceplate. In such a circumstance, the light may be used to illuminate the entire faceplate. The base could conceal the light, if powered directly by the vessel; or the battery/light if a self contained illumination system is employed.

The buoyage indicator may also be placed on a display monitor in a vessel by inputting a portside and starboard side daymark indicia into a computer system; coupling a chart plotter to said computer, said chart plotter having sufficient detail to distinguish channel markers; merging a GPS signal to said chart plotter providing a directional aspect to said chart plotter; and displaying said daymark indicia on a monitor, said display positioning said portside and starboard side indicia in accordance with said directional movement of said vessel in accordance with said chart plotter and said GPS.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A navigation aid comprising:

a base support securable to a surface of a marine vessel; a faceplate support rotatably secured by use of a pinion secured to a support base and extending upwardly therefrom; a means for biasing said faceplate against said base support, said faceplate having a first side edge and a second side edge; a faceplate frontal surface with marine marker indicia, said marine marker indicia including a first replica resembling a green daymark juxtaposed along said faceplate first side edge and a second replica resembling a red daymark juxtaposed along said faceplate second side edge; and a faceplate rear surface with marine marker indicia, said marine marker indicia including a third replica resembling a green daymark juxtaposed along said faceplate first side edge and a fourth replica resembling a red daymark juxtaposed along said faceplate second side edge.

2. The navigation aid according to claim 1 wherein said first and third replicas include indicia representing an odd numeral; and said second and fourth replicas include indicia representing an even numeral.

3. The navigation aid according to claim 1 wherein said indicia is placed on reflective material.

4. The navigation aid according to claim 1 wherein said indicia is placed on a fluorescent material.

5. The navigation aid according to claim 1 including an illumination means for illuminating said faceplate.

6. The navigation aid according to claim 1 wherein said base support includes a top angular shape portion and said faceplate includes a bottom angular shape portion, said top portion operatively associated with said bottom portion.

7. The navigation aid according to claim 1 wherein said faceplate includes directional arrow indicia positioned thereon.

8. The navigation aid according to claim 1 wherein said indicia is embedded into said faceplate.

9. A navigation aid comprising:

a base support securable to a surface of a marine vessel; a faceplate support rotatably secured to said support base, said faceplate support being rotatably secured by use of a pinion secured to said base and extending upwardly therefrom, said faceplate having a centrally disposed aperture for placement of said pinion; a pinion end cap; and a spring disposed between said end cap and said faceplate for biasing said faceplate against said base support, said faceplate having a frontal surface with marine marker indicia and a rear surface with marine marker indicia, said marine marker indicia being defined as a replica of a green can buoy and a red nun buoy.

10. The navigation aid according to claim 9 wherein said green can buoy and red nun buoy includes a numeral placed within said indicia.

11. A navigation aid comprising:

a base support securable to a surface of a marine vessel, said base support having a pinion secured thereto and extending upwardly therefrom; a faceplate support having a centrally disposed aperture for rotatable securement to said pinion, said faceplate having a frontal surface with green and red daymark indicia and a rear surface having red and green daymark indicia; and a means for positioning said faceplate in a fixed position to said base support.

12. The navigation aid according to claim 11 including a spring operatively associated with said pinion for biasing said faceplate against said base support.

13. The navigation aid according to claim 11 wherein said indicia includes numerical numbering.

14. The navigation aid according to claim 11 wherein said indicia is placed on reflective material.

15. The navigation aid according to claim 11 wherein said indicia is placed on fluorescent material.

16. The navigation aid according to claim 11 including an illumination means for said faceplate.

* * * * *